US012046180B2

(12) United States Patent
Park et al.

(10) Patent No.: US 12,046,180 B2
(45) **Date of Patent: *Jul. 23, 2024**

(54) METHOD AND DEVICE FOR COMPENSATING LUMINANCE DEVIATION AND DISPLAY DEVICE USING THE SAME

(71) Applicant: LG Display Co., Ltd., Seoul (KR)

(72) Inventors: Geon Ho Park, Paju-si (KR); Won Yeol Lee, Paju-si (KR); Cheon Heo, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/180,099

(22) Filed: Mar. 7, 2023

(65) Prior Publication Data

US 2023/0222953 A1 Jul. 13, 2023

Related U.S. Application Data

(63) Continuation of application No. 17/336,744, filed on Jun. 2, 2021, now Pat. No. 11,636,797.

(30) Foreign Application Priority Data

Aug. 20, 2020 (KR) ........................ 10-2020-0104741

(51) Int. Cl.
*G09G 3/20* (2006.01)
*G09G 3/3208* (2016.01)

(52) U.S. Cl.
CPC ......... *G09G 3/2003* (2013.01); *G09G 3/3208* (2013.01); *G09G 2310/027* (2013.01);
(Continued)

(58) Field of Classification Search
None
See application file for complete search history.

(56) References Cited

U.S. PATENT DOCUMENTS 8,913,092 B2 12/2014 Ha et al.
9,911,374 B2 3/2018 Park et al.
(Continued)

FOREIGN PATENT DOCUMENTS

CN 104517568 A 4/2015
CN 105741816 A 7/2016
(Continued)

OTHER PUBLICATIONS

China National Intellectual Property Administration, Office Action, Chinese Patent Application No. 202110587054.2, Sep. 28, 2023, 13 pages.
(Continued)

*Primary Examiner* — Benjamin C Lee
*Assistant Examiner* — Emily J Frank
(74) *Attorney, Agent, or Firm* — Fenwick & West LLP

(57) ABSTRACT

The present disclosure relates to a method and a device for compensating for a luminance deviation. A difference in pixel value of the image capturing device between a first pixel and a second pixel in the screen and a difference in gray scale level between first and second gray scale levels are derived from a captured image at the first gray scale level and a captured image at the second gray scale level which include pixel values of the image capturing device. A pixel value for the second pixel is calculated from the captured image at the first gray scale level.

9 Claims, 12 Drawing Sheets

(52) U.S. Cl.
CPC ............... *G09G 2320/0233* (2013.01); *G09G 2360/145* (2013.01)

(56) References Cited

U.S. PATENT DOCUMENTS

| | | | | |
|---|---|---|---|---|
| 10,325,552 | B2 | 6/2019 | Jeong et al. | |
| 10,460,639 | B2 | 10/2019 | Gu et al. | |
| 11,211,018 | B1 * | 12/2021 | Sun | G09G 3/3426 |
| 11,450,267 | B2 | 9/2022 | Han et al. | |
| 11,636,797 | B2 * | 4/2023 | Park | G09G 3/2011 345/690 |
| 2008/0106491 | A1 | 5/2008 | Cox et al. | |
| 2012/0074851 | A1 * | 3/2012 | Erinjippurath | G09G 3/20 315/158 |
| 2012/0206504 | A1 | 8/2012 | Ha et al. | |
| 2015/0097872 | A1 | 4/2015 | Jeong et al. | |
| 2016/0189620 | A1 | 6/2016 | Park et al. | |
| 2019/0066555 | A1 | 2/2019 | Gu et al. | |
| 2019/0066574 | A1 | 2/2019 | Wang | |
| 2019/0237001 | A1 | 8/2019 | Lin et al. | |
| 2019/0385544 | A1 * | 12/2019 | Tan | G09G 3/3607 |
| 2021/0327343 | A1 * | 10/2021 | Han | G09G 3/3225 |
| 2021/0358406 | A1 * | 11/2021 | Zhang | G09G 3/3233 |

FOREIGN PATENT DOCUMENTS

| | | | |
|---|---|---|---|
| CN | 108831374 | A | 11/2018 |
| CN | 109427300 | A | 3/2019 |
| KR | 10-2012-0092982 | A | 8/2012 |
| KR | 10-2018-0042568 | A | 4/2018 |
| KR | 10-2018-0079563 | A | 7/2018 |
| KR | 10-2019-0021761 | A | 3/2019 |
| WO | WO 2019/242367 | A1 | 12/2019 |

OTHER PUBLICATIONS

European Patent Office, Partial European Search Report, EP Patent Application No. 21190508.8, Jan. 21, 2022, 16 pages.

Extended European Search Report, European Patent Application No. 21190508.8, May 19, 2022, 19 pages.

United States Office Action, U.S. Appl. No. 17/336,744, filed Sep. 6, 2022, nine pages.

United States Office Action, U.S. Appl. No. 17/336,744, filed Mar. 31, 2022, 14 pages.

Korean Intellectual Property Office, Office Action, Korean Patent Application No. 10-2020-0104741, Mar. 22, 2024, 19 pages.

* cited by examiner

DIFFERENCE IN CAMERA INTENSITY ACCORDING TO POSITION IN 32G IMAGE

RESULT OF CONVERTING DIFFERENCE (ΔI) IN CAMERA INTENSITY ACCORDING TO POSITION TO DIFFERENCE (ΔG) IN GRAY SCALE LEVEL IN 32G IMAGE

METHOD AND DEVICE FOR COMPENSATING LUMINANCE DEVIATION AND DISPLAY DEVICE USING THE SAME

CROSS-REFERENCE TO RELATED APPLICATION

This application is a continuation application of U.S. patent application Ser. No. 17/336,744 filed on Jun. 2, 2021, which claims priority to and the benefit of Korean Patent Application No. 10-2020-0104741, filed on Aug. 20, 2020, the disclosures of all of which are incorporated herein by reference in their entirety.

BACKGROUND

1. Technical Field of the Disclosure

The present disclosure relates to a method and a device for compensating a luminance deviation which derive compensation data and compensate the luminance deviation on the basis of a result of capturing an image of a screen. In addition, the present disclosure relates to a display device which compensates for a luminance deviation using the device for compensating the luminance deviation.

2. Discussion of Related Art

In a method for compensating a luminance deviation of a display device, pixels of a screen may be turned on, an image of the screen may be captured by a camera, and the image obtained by the camera may be analyzed to measure a luminance deviation of the screen. In this method, compensation data for compensating the luminance deviation obtained from the captured image may be set. When pixel data of an input image is input, the display device modulates the pixel data using the preset compensation data and writes the modulated pixel data to the pixels.

In the method of compensating for the luminance deviation, a specific gray scale level value may be written to each pixel of a display panel, luminance of the pixels is captured by a camera in a state in which the pixels are turned on at the same gray scale levels, and luminance deviations are measured on the basis of intensities of images which are captured and output by the camera. Although specific gray scale level data is input to all pixels included in the display panel, the luminance of the pixels may be different from each other according to positions of the pixels in the screen.

In order to measure the luminance deviations between the pixels, a luminance meter, for example, CA-310, measures luminance of the pixels at preset sample points on the screen in the state in which the pixels of the display panel are turned on using the specific gray scale level data. A scaling gain may be set to correspond to ratios of the measured luminance to pixels values of the camera in order to apply ratio relationships between the measured luminance and pixel values of the camera at the sample points to all pixels, and luminance values of the pixels may be interpolated using the gain to calculate pixel luminance deviations of the sample points with respect to a reference pixel and generate a luminance conversion look-up table. In this case, since a scale of the pixel value of the camera is different from a scale of the measured luminance value, an error may occur. In order to compensate for the luminance deviations, the luminance deviations are converted to gray scale level compensation values. When the luminance deviations are converted to the gray scale level compensation values, an error may occur. The luminance compensation values determined as described above are added to pixel data of an input image to compensate for the luminance deviations between the pixels when the display device is driven.

SUMMARY OF THE DISCLOSURE

In the method of compensating for a luminance deviation, since an error occurs when a pixel value of a camera is converted to luminance data, and errors may occur in a non-linear section when a luminance deviation is converted to a gray scale level compensation value and gray scale level data is converted to a voltage, it is difficult to accurately compensate for the luminance deviation between pixels.

In the method of compensating for a luminance deviation, a scaling gain may be set by being adjusted for each gray scale level and each model. Although a representative panel for each model may be selected to set the scaling gain, since luminance deviations may differ between display panels even in the same model, the scaling gain may not be optimized to all display panels. Since a mura level of the display panel is evaluated while the scaling gain is changed according to a gray scale level, a process time may be increased and the mura level may differ between workers. Since tuning is repeated for each model, the process time may be increased since an additional process is required when the gray scale level is changed and the mura level of the display panel is changed even in the same model, and the above-descried processes should be repeated from the beginning when compensation data is not accurate, a processing time may be increased, and a yield may be reduced.

In the method of compensating for a luminance deviation, although a luminance property of the pixel of an entire region of the display panel is assumed as a 2.2 gamma curve, the luminance property of the pixel may not follow the 2.2 gamma curve. In this case, overcompensation or incomplete compensation of the luminance deviation may occur.

An object of the present disclosure is to solve the above-mentioned needs and/or problems.

The present disclosure is directed to providing a method and a device for compensating for a luminance deviation capable of quickly and accurately determining compensation data for compensating for a luminance deviation between pixels.

In addition, the present disclosure is directed to providing a display device configured to compensate for a luminance deviation between pixels using the method and the device for compensating for a luminance deviation.

It should be noted that objects of the present disclosure are not limited to the above-described objects, and other objects of the present disclosure will be apparent to those skilled in the art from the following descriptions.

According to an aspect of the present disclosure, there is provided a method of compensating for a luminance deviation, the method including inputting an input image having first gray scale level data to pixels disposed in a screen of a display panel to capture an image of the screen, inputting an input image having second gray scale level data to the pixels to capture an image of the screen.

The method of compensating for a luminance deviation includes deriving a difference in pixel value of the image capturing device between a first pixel and a second pixel in the screen and a difference in gray scale level between first and second gray scale levels from a captured image at the first gray scale level and a captured image at the second gray scale level which include pixel values of the image capturing device, calculating a pixel value for the second pixel from the captured image at the first gray scale level, and converting the difference in pixel value of the image capturing device between the first pixel and the second pixel at the first gray scale level to a difference in gray scale level to derive compensation data of the second pixel using the difference in pixel value of the image capturing device and the difference in gray scale level.

According to another aspect of the present disclosure, there is provided a luminance compensation device including a device configured to perform the method.

According to still another aspect of the present disclosure, there is provided a display device configured to compensate for a luminance deviation between pixels using an inclination and an offset of a compensation voltage derived through the method and the device for compensating the luminance deviation and a look-up table (LUT) with preset gray scale level and voltage set corresponding to luminance.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
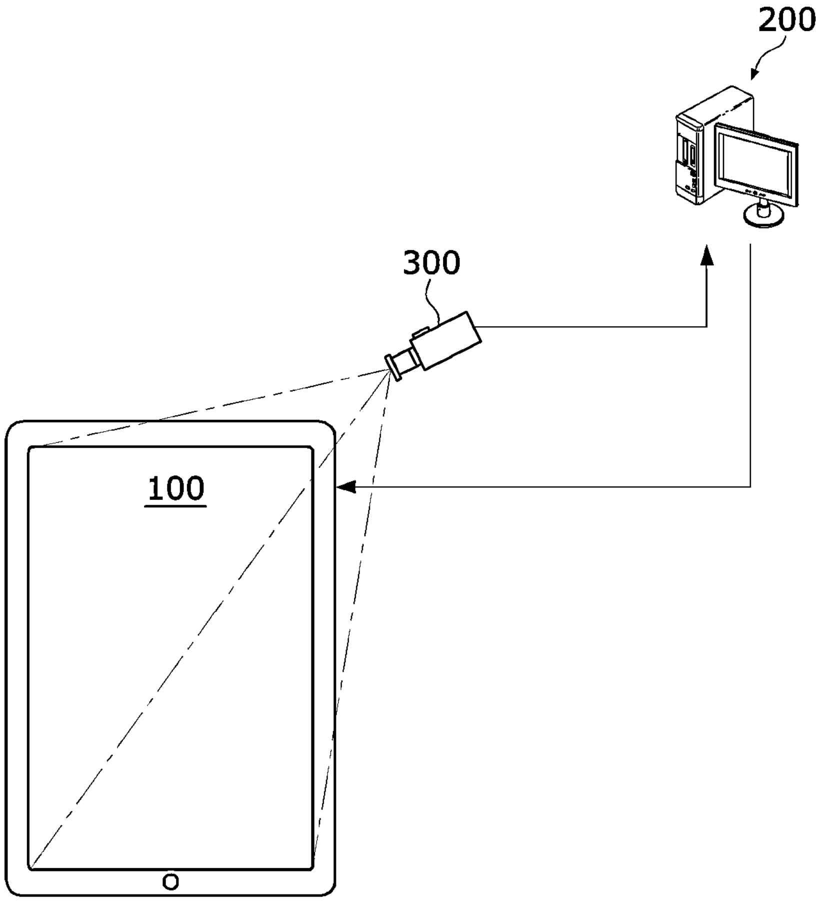
FIGS. 1 and 2 are views illustrating a luminance deviation compensation device according to an embodiment of the present disclosure.

The advantages and features of the present invention and methods for accomplishing the same will be more clearly understood from embodiments described below with reference to the accompanying drawings. However, the present invention is not limited to the following embodiments but may be implemented in various different forms. Rather, the present embodiments will make the disclosure of the present invention complete and allow those skilled in the art to completely comprehend the scope of the present invention. The present invention is only defined within the scope of the accompanying claims.

The shapes, sizes, ratios, angles, numbers, and the like illustrated in the accompanying drawings for describing the embodiments of the present invention are merely examples, and the present invention is not limited thereto. Like reference numerals generally denote like elements throughout the present specification. Further, in describing the present invention, detailed descriptions of known related technologies may be omitted to avoid unnecessarily obscuring the subject matter of the present invention.

The terms such as "comprising," "including," "having," and "consist of" used herein are generally intended to allow other components to be added unless the terms are used with the term "only." Any references to singular may include plural unless expressly stated otherwise.

Components are interpreted to include an ordinary error range even if not expressly stated.

When the position relation between two components is described using the terms such as "on," "above," "below," and "next," one or more components may be positioned between the two components unless the terms are used with the term "immediately" or "directly."

The terms "first," "second," and the like may be used to distinguish components from each other, but the functions or structures of the components are not limited by ordinal numbers or component names in front of the components.

The following embodiments can be partially or entirely bonded to or combined with each other and can be linked and operated in technically various ways. The embodiments can be carried out independently of or in association with each other.

Hereinafter, various embodiments of the present invention will be described in detail with reference to the accompanying drawings.

According to the present disclosure, in an inspection process before shipping a product, an image of a screen is captured by an image capturing device such as a camera, luminance deviations between pixels are analyzed, compensation values are derived on the basis of an analysis result thereof, and the luminance deviations in the screen are compensated for.

Figure 2:
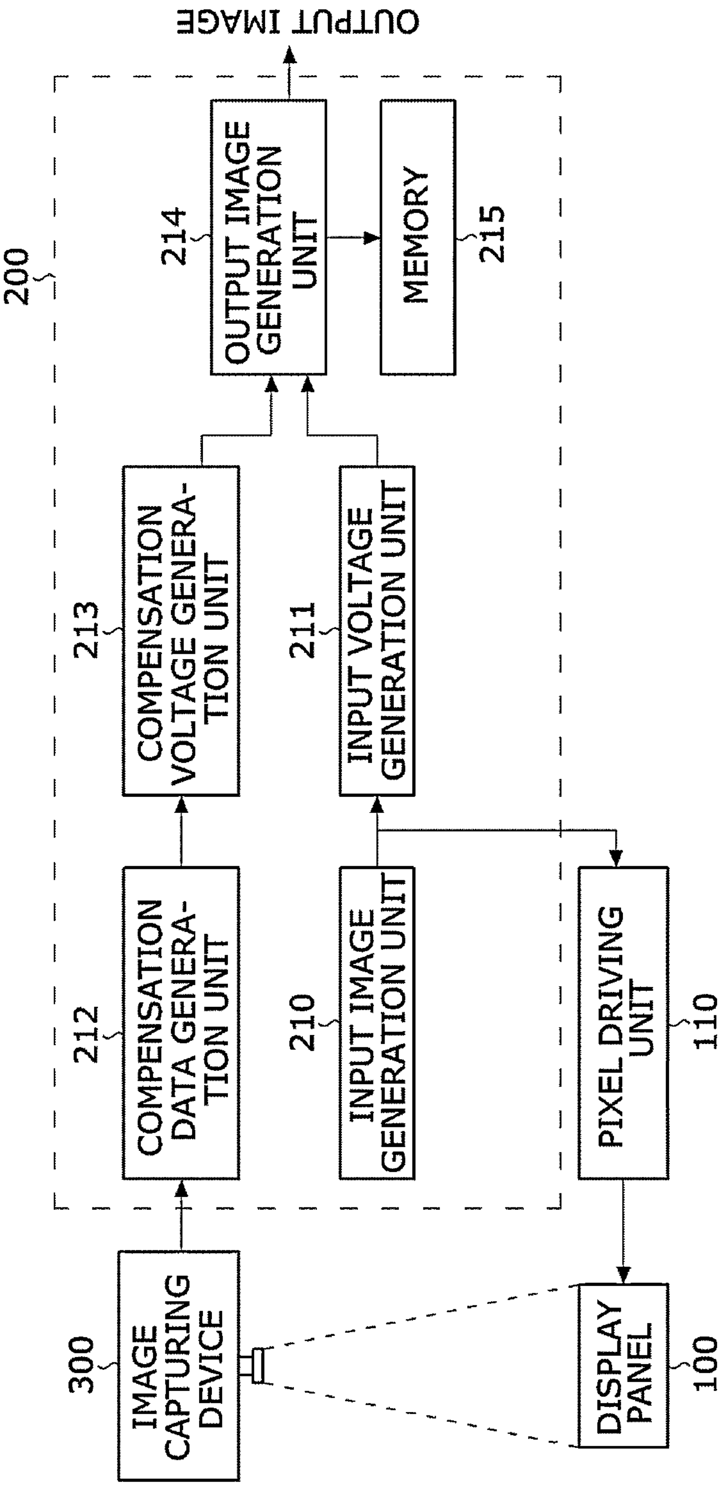
Figure 3:
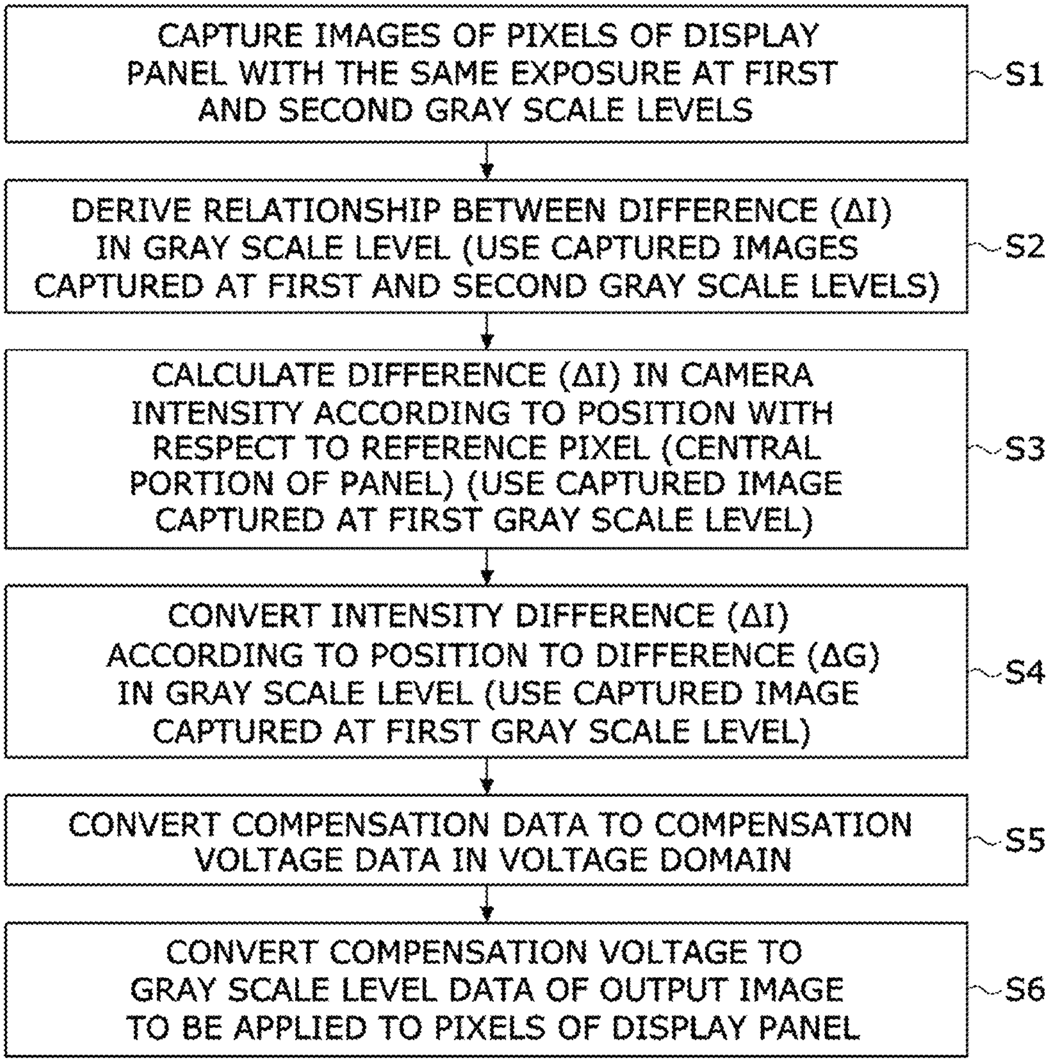
FIG. 3 is a flowchart showing a method of compensating for a luminance deviation according to a first embodiment of the present disclosure.

FIGS. 1 and 2 are views illustrating a luminance deviation compensation device according to an embodiment of the present disclosure. FIG. 3 is a flowchart showing a method of compensating for a luminance deviation according to a first embodiment of the present disclosure.

Referring to FIG. 1, the luminance deviation compensation device includes an image capturing device 300 and a luminance deviation compensation device 200.

The image capturing device 300 is disposed to face the display panel 100 and captures an image of the display panel 100 for a preset exposure time. The image capturing device 300 transmits captured image data obtained by capturing the image of the screen to the luminance deviation compensation device 200. The image capturing device 300 may be a camera supporting a high dynamic range (HDR) but is not limited thereto.

Care should be taken that a pixel value of the image capturing device 300 is not pixel data written to a pixel of the display panel but is a digital value output from a pixel of an image sensor of the image capturing device 300. Hereinafter, the pixel value of the image capturing device 300 will be referred to as a "camera intensity."

The luminance deviation compensation device 200 generates input image data of first and second gray scale levels between which a predetermined difference in gray scale level is present. Hereinafter, the first gray scale level is a sample gray scale level to be compensated for, and the second gray scale level is a gray scale level value having the predetermined difference in gray scale level from the first gray scale level. The second gray scale level may be an upper or lower gray scale level having the predetermined difference in gray scale level from the first gray scale level.

An input image data at the first gray scale level and the second gray scale level are converted to pixel voltages by a pixel driving unit 110, and the pixel voltages are written to pixels of the display panel 100. The image capturing device 300 captures images of the pixels in which first gray scale level data is input and captures images of the pixels in which second gray scale level data is input. The image capturing device 300 may capture the images of the pixels, in which the second gray scale level data is input, with an exposure value which is the same as an exposure value when capturing an image of a reference pixel in the screen in the state in which the first gray scale level data is input to the pixels. The exposure value of the image capturing device 300 may be set as an exposure value when a camera intensity is output with a median value or a similar value thereto when the image capturing device 300 captures the image of the reference pixel.

Each of the camera intensities of the pixels of the image sensor of the image capturing device may have a value of 0 to 4095 based on 12 bits, and the median value is 2048. As an exposure time is increased, the pixel value of the image capturing device 300 may be generated to have a higher value. When the pixel value of the reference pixel is a median value, luminance deviation values with respect to the reference pixel for each position are not saturated in the entire screen.

The luminance deviation compensation device 200 receives the captured image data from the image capturing device 300 at the first and second gray scale levels of the input image data. The luminance deviation compensation device 200 calculates a difference ΔI in camera intensity with respect to the reference pixel using the captured image data and derives a relationship between the difference ΔI in camera intensity and a difference ΔG in gray scale level.

The luminance deviation compensation device 200 calculates the difference ΔI in camera intensity with respect to the reference pixel for each position in the screen using a correlation between the difference ΔI in camera intensity and the difference ΔG in gray scale level. The luminance deviation compensation device 200 derives compensation data for each position in the screen by converting the difference ΔI in camera intensity to the difference ΔG in gray scale level for each position with respect to the reference pixel in the screen. Due to a luminance deviation with respect to the reference pixel for each position in the screen, the difference in gray scale level written to the display panel and the difference in gray scale level on which the luminance deviation is reflected may be different from each other for each position in the screen.

The luminance deviation compensation device 200 converts the compensation data to a voltage value of a voltage domain to generate a compensation voltage. Then, the luminance deviation compensation device 200 adds an input image voltage at the first gray scale level and the compensation voltage to generate output image data. The luminance deviation compensation device 200 may write the output image data to the pixels of the display panel 100, and an effect of the luminance deviation compensation may be confirmed on the basis of a difference in camera intensity of the captured image data received from the image capturing device 300 at that time.

The luminance deviation compensation device 200 generates compensation data for gray scale levels except the sample gray scale levels in the interpolation method, generates compensation data for all gray scale levels, of which luminance deviations are minimized, and stores the compensation data in a memory.

An embodiment of FIGS. 2 and 3 will be described in connection with FIGS. 4 to 8.

Referring to FIGS. 2 and 3, the method of compensating for a luminance deviation according to the present disclosure includes inputting first gray scale level data to the pixels disposed in the display panel 100 to capture an image of the screen, and inputting second gray scale level data to the pixels to capture an image of the screen (S1 of FIG. 3), deriving a difference in pixel value of the image capturing device between a first pixel and a second pixel in the screen and a difference in gray scale level between the first and the second gray scale levels from the captured image at the first gray scale level and the captured image at the second gray scale level which include pixels values of the image capturing device and the captured image at the first gray scale level and the captured image at the second gray scale level which include pixel values of the image capturing device of the first pixel and the second pixel in the screen (S2 of FIG. 3), calculating a pixel value for the second pixel from the captured image of the first gray scale level (S3 of FIG. 3), and converting the difference in pixel value of the image capturing device between the first pixel and the second pixel at the first gray scale level to a difference in gray scale level to derive compensation data of the second pixel using the difference in pixel value of the image capturing device and the difference in gray scale level (S4 of FIG. 3). In this case, the pixel value of the image capturing device may be interpreted as a camera intensity. Hereinafter, the first pixel may be the reference pixel. Hereinafter, the second pixel may be the pixel at a position A.

The luminance deviation compensation device 200 includes an input image generation unit 210, an input voltage generation unit 211, a compensation data generation unit 212, a compensation voltage generation unit 213, and an output image generation unit 214.

The input image generation unit 210 generates first and second gray scale level data of an input image. In FIGS. 4 to 8, the first gray scale level is illustrated as a gray scale level 32 (32G), and the second gray scale level is illustrated as a gray scale level 36 (36G), but the present disclosure is not limited thereto. The pixel driving unit 110 writes the first gray scale level data to all pixels disposed in the display panel 100, and after an image of the pixels to which the first gray scale level is written is captured, the second gray scale level data is input to the pixels. With a predetermined exposure value, the image capturing device 300 captures an image of the pixels turned on by the first gray scale level data and captures an image of the pixels turned on by the second gray scale level data (S1 of FIG. 3).

The pixel driving unit 250 may be a driver integrated circuit (IC) connected to signal lines of the display panel or a test jig configured to apply signals to signal lines through a probe. The signal lines of the display panel include data lines to which data voltages are applied and gate lines to which gate signals (or scan signals) are applied.

Figure 4:
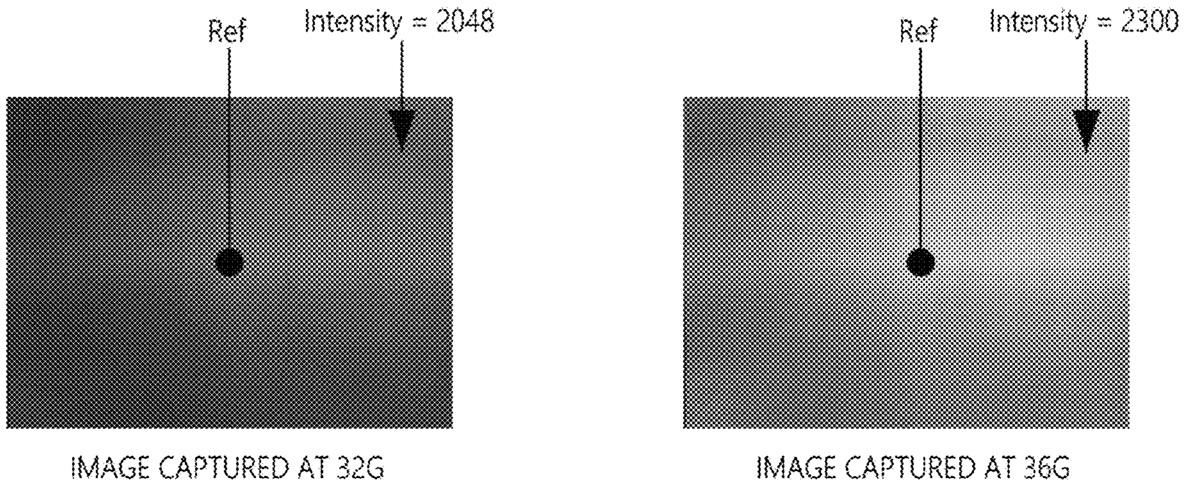
FIG. 4 is a view illustrating one example in which captured images are obtained by capturing images of a screen at a gray scale level 32 and a gray scale level 36 using the same exposure value.

As illustrated in FIG. 4, a reference pixel Ref may be set as a central pixel of the screen. An exposure value of the image capturing device 300 is set as an exposure value when an intensity of the reference pixel is output with a median value in a range of a pixel intensity when an image of the reference pixel is captured in a state in which the first gray scale level data is written to the pixels in the screen. With an exposure value which is the same as the above-described exposure value, the image capturing device 300 captures an image of the pixels to which second gray scale level data is written.

When a proper exposure value of the image capturing device is set at a first gray scale level and an image is captured at a second gray scale level with an exposure value which is the same as that described above, luminance of the pixels may be accurately displayed with a camera intensity according to a change in gray scale level value of input data of the pixels even though there is a large luminance deviation in the entire screen. Instead of brightness of the pixel of the display panel 100 being measured by a separate luminance meter, brightness of each of the pixels according to the positions thereof when the first gray scale level data is input to the pixels of the display panel 100 may be obtained from pixel data of the captured image having a value of 0 to 4096 based on the camera intensity.

FIG. 4 is a view illustrating one example of captured images obtained by capturing images of the screen at a first gray scale level 32G and a second gray scale level 36G using the same exposure value. When a luminance of the first gray scale level 32G is captured with a proper exposure value at the reference pixel set as a central pixel of the screen, a camera intensity of the reference pixel may be 2048. When a luminance of the second gray scale level 36G is captured using the same exposure value at the reference pixel, a camera intensity may be 2300.

The compensation data generation unit 212 receives captured image data from the image capturing device 300 at the first and second gray scale levels. The compensation data generation unit 212 calculates a difference ΔI in camera intensity from the captured image data according to a position with respect to the reference pixel Ref. The compensation data generation unit 212 derives a relationship between the difference ΔI in camera intensity and a difference ΔG in gray scale level (S2 of FIG. 3).

Figure 5:
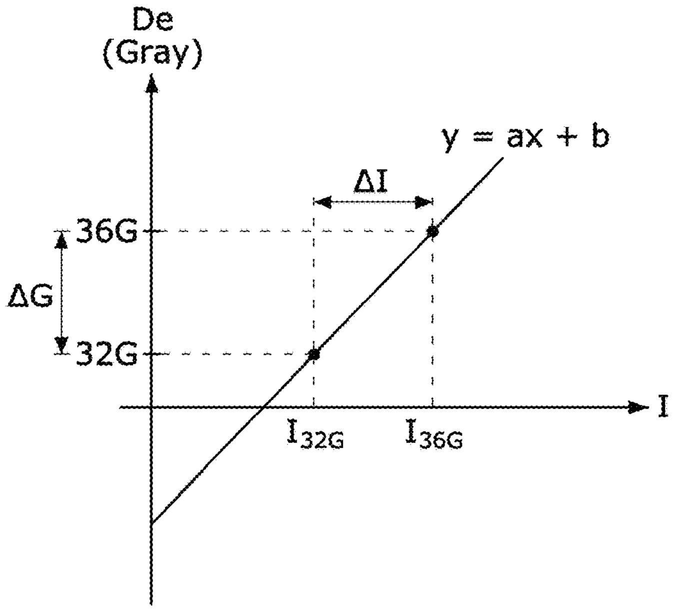
FIG. 5 is a view illustrating one example of linear fitting of a luminance and a pixel intensity obtained from a result of a De-gamma operation.

A gray scale level versus a luminance property of the pixel increases along a curve of the power of 2.2 as a gray scale level value increases. When a de-gamma operation is applied to the gamma curve to convert the luminance property versus the gray scale level to a linear property, and a luminance is expressed with a camera intensity value, the luminance is expressed as illustrated in FIG. 5. A relationship between the difference ΔI in camera intensity and the difference ΔG in gray scale level which are mapped at the first and second gray scale levels 32G and 36G may be derived from a linear line, that is y=ax+b, of a linear function obtained from a result of the de-gamma operation. In the linear line of y=ax+b in FIG. 5, a is an inclination, and b is a y-intercept.

The compensation data generation unit 212 calculates a difference ΔI in camera intensity with respect to the reference pixel Ref according to a position in the screen using captured image data captured at the first gray scale level 32G.

In an example of FIG. 4, a camera intensity of the reference pixel Ref is 2048 at the first gray scale level 32G and 2300 at the second gray scale level 36G. In this case, a relationship between a difference ΔI in camera intensity and a difference ΔG in gray scale level at the reference pixel Ref is +252:+4.

A camera intensity of the pixel at the position A spaced apart from the reference pixel Ref is 1980 at the first gray scale level 32G and 2235 at the second gray scale level 36G. In this case, a relationship between a difference ΔI in camera intensity and a difference ΔG in gray scale level at an A pixel is +255:+4.

The compensation data generation unit 212 calculates differences ΔI in camera intensity with respect to the reference pixel Ref according to positions in the screen at the first gray scale level using the captured image data captured at the first gray scale level 32G to derive relationships between the differences ΔI in camera intensity and the difference ΔG in gray scale level of all pixels (S3 of FIG. 3).

Figure 6:
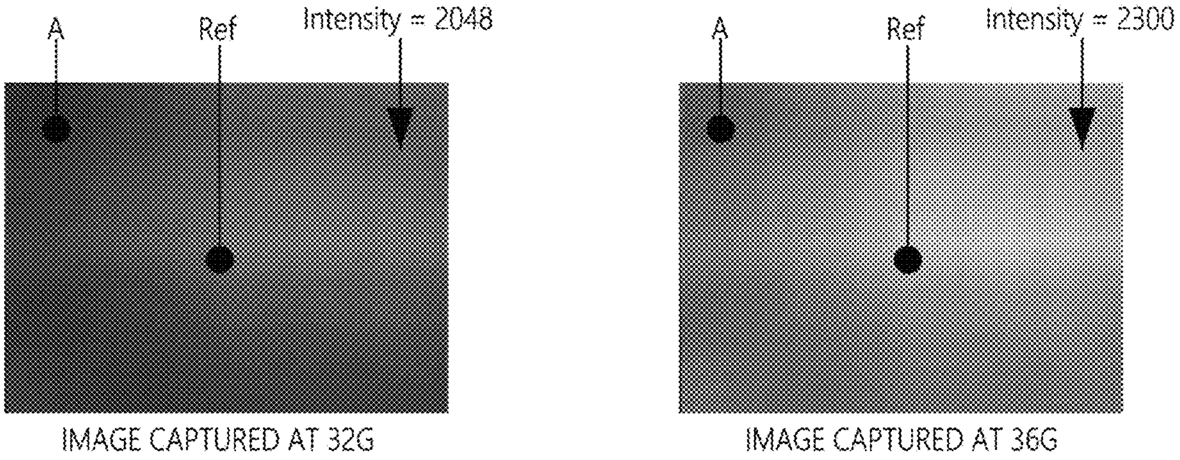
FIG. 6 is a view illustrating one example of a difference in camera intensity of a reference pixel between captured images at a first gray scale level and a second gray scale level.
Figure 7:
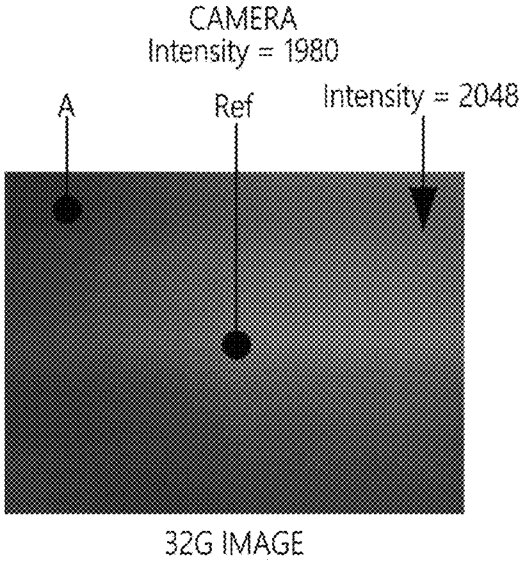
FIG. 7 is a view illustrating one example of a result of camera intensity calculation of a position A with respect to the reference pixel.

A difference ΔI in camera intensity of the position A with respect to the reference pixel Ref at the first gray scale level 32G is 2048−1980=68 in an example of FIGS. 6 and 7. Accordingly, in the present disclosure, the difference ΔI in camera intensity at a gray scale level to be compensated for may be calculated according to each of the positions in the screen with respect to the reference pixel to derive compensation data using the captured image without a luminance measurement result.

Figure 8:
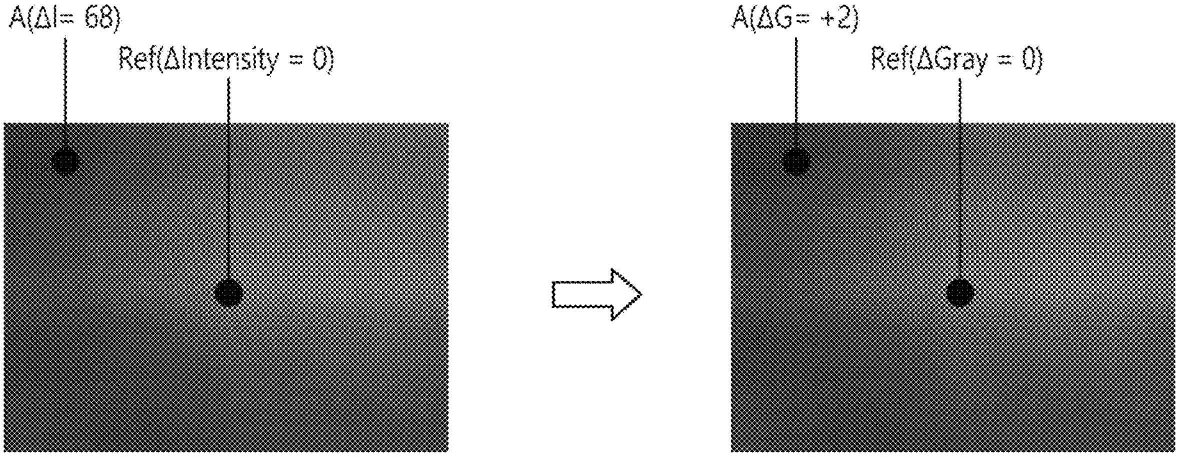
FIG. 8 is a view illustrating one example in which the difference in camera intensity is converted to a difference in gray scale level at the first gray scale level at the position A.

The compensation data generation unit 212 generates the compensation data which compensates all pixels for luminance deviations with respect to the reference pixel Ref by converting the differences ΔI in camera intensity according to the positions in the screen to the difference ΔG in gray scale level using the captured image at the first gray scale level (S4 of FIG. 3). As illustrated in FIG. 8, ΔI=68 at the position A may be converted to ΔG=+2 at the first gray scale level 32G using the relationship between the difference ΔI in camera intensity and the difference ΔG in gray scale level derived in operation S2 of FIG. 3. ΔG=+2 is a gray scale level value of the compensation data applied to the pixel at the position A. The compensation data generation unit 212 may generate a compensation table in which the compensation data of the first gray scale level is mapped for each position in the screen.

The input voltage generation unit 211 converts input image data of the first and second gray scale levels written to the display panel to an input voltage using a luminance-gray scale level-voltage table preset for optical compensation. In the luminance-gray scale level-voltage table, a gray scale level and a voltage corresponding to each luminance value of the pixels are set.

Figure 10A:
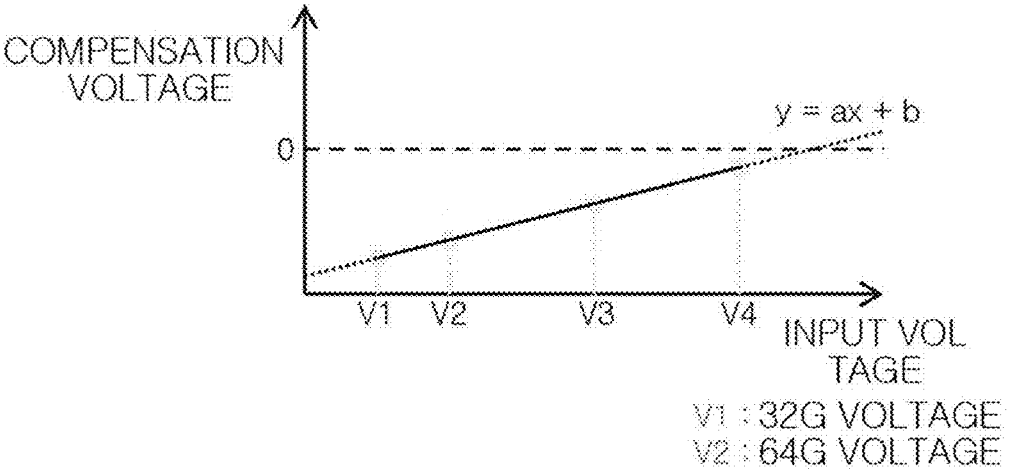
FIGS. 10A and 10B are a set of graphs showing one example of input voltages and output voltages at the sample gray scale levels for each position in the screen.
Figure 10B:
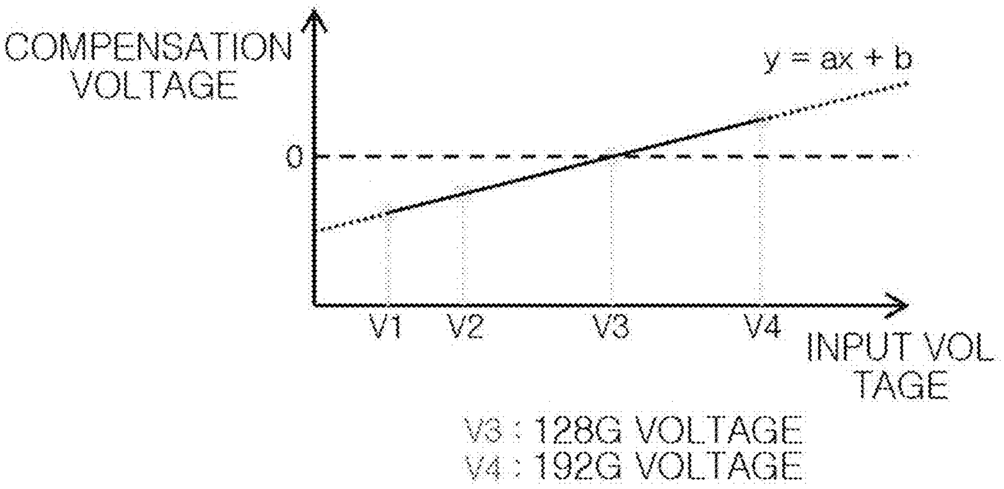

The compensation voltage generation unit 213 converts the compensation data to a compensation voltage using the luminance-gray scale level-voltage table. As illustrated in FIGS. 10A and 10B, the compensation voltage generation unit 213 may multiply the input voltage and an inclination a of a linear function and add the input voltage and a y-intercept b thereof using a result of fitting the input voltage and the compensation voltage as a linear line of the linear function (S5 of FIG. 3).

The output image generation unit 214 adds the input voltage and the compensation voltage to calculate an output voltage and converts the output voltage to compensation gray scale level data for an output image for each position in the screen using the luminance-gray scale level-voltage table (S6 of FIG. 3). The inclination a and the y-intercept b of the compensation voltage calculated in operation of S5 and the luminance-gray scale level-voltage table is stored in a memory 215. The data stored in the memory 215 are used as compensation values for compensating luminance deviations in the display device.

Figure 9:
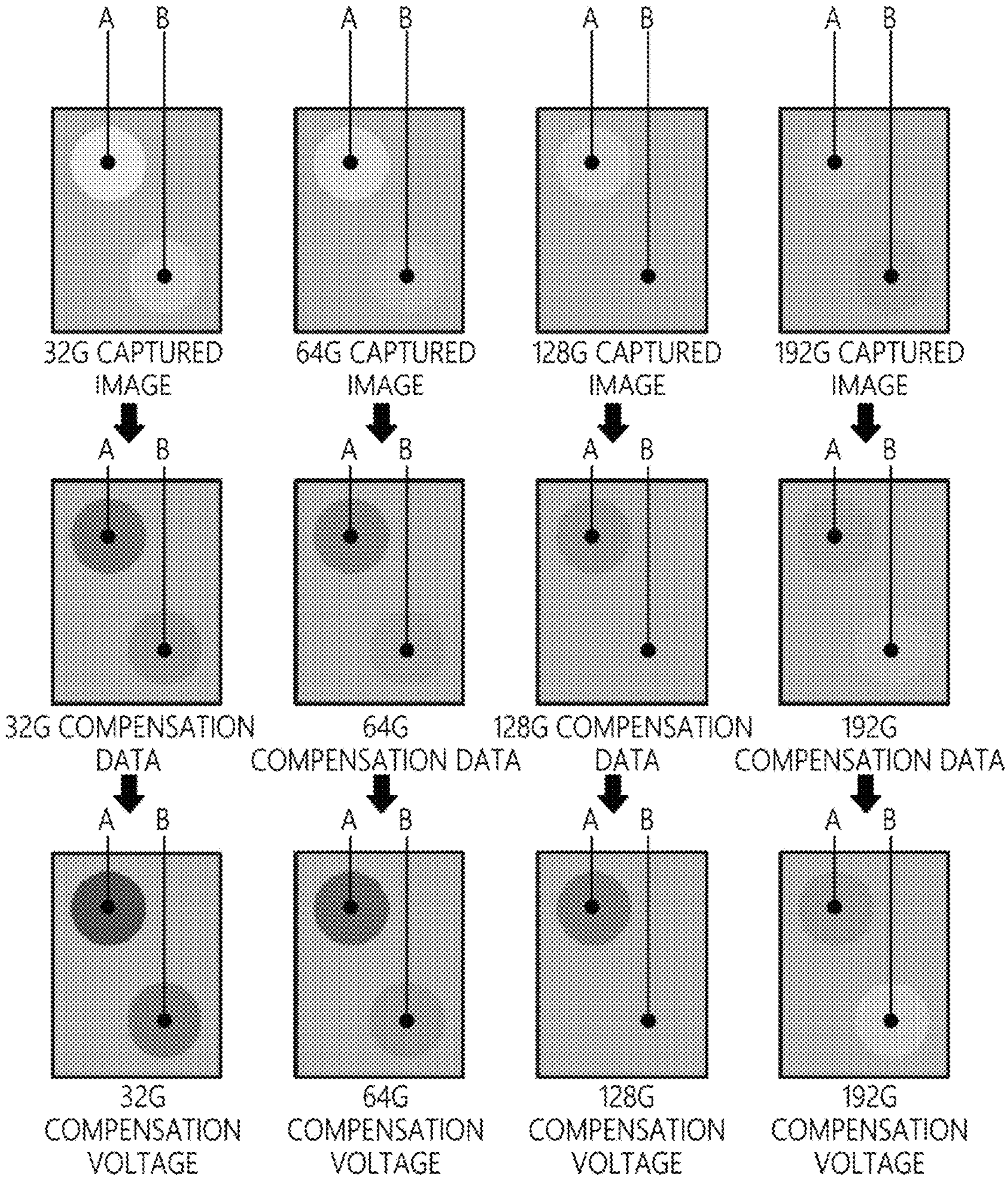
FIG. 9 is a schematic view showing captured images, compensation data, and compensation voltages at sample gray scale levels for compensating for luminance deviations according to positions in a screen.

FIG. 9 is a schematic view showing captured images, compensation data, and compensation voltages at sample gray scale levels for compensating luminance deviations according to the positions in the screen. FIGS. 10A and 10B are a set of graphs showing one example of input voltages and output voltages at the sample gray scale levels for each position in the screen. In examples of FIGS. 9 and 10A and 10B, sample gray scale levels include 32G, 64G, 128G, and 192G. FIG. 10A is a view showing one example of an input voltage and an output voltage at a position A, and FIG. 10B is a view showing an input voltage and an output voltage at a position B. The compensation voltage may be a positive or negative voltage. The luminance deviation compensation device 200 may calculate compensation data, compensation voltages, and output image data at gray scale levels except the sample gray scale levels in an interpolation method using the compensation data calculated from the sample gray scale levels to compensate all pixels in the screen for luminance deviations at all gray scale levels.

Figure 11:
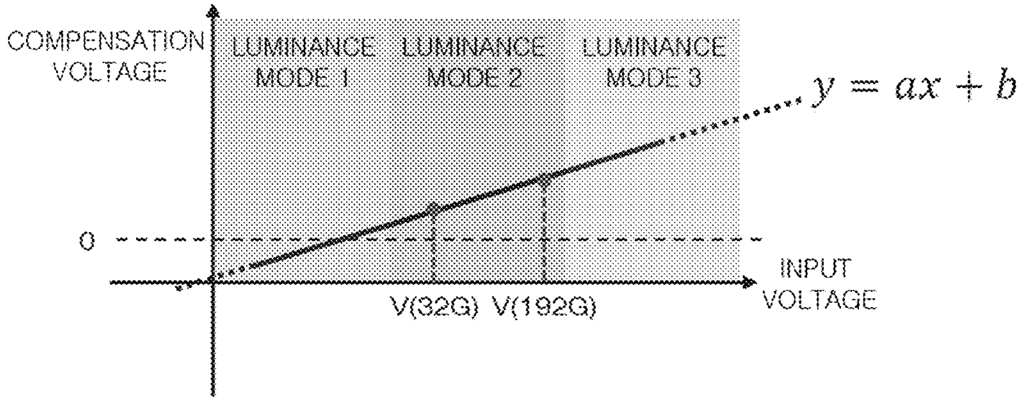
FIG. 11 is a graph showing one example of an input voltage and a compensation voltage in an extended luminance mode.

FIG. 11 is a graph showing one example of an input voltage and a compensation voltage in an extended luminance mode.

Referring to FIG. 11, the above-described embodiment may also be applied to the extended luminance mode. In FIG. 11, a luminance mode 1 may be a low-luminance mode, a luminance mode 2 may be a normal mode, and a luminance mode 3 may be a high-luminance mode. A luminance mode may be selected by a user or automatically selected according to a display brightness value (DBV). The DBV may be determined according to an output signal of an illuminance sensor connected to a host system configured to transmit an image signal to the display device or according to a luminance input value of the user.

In an example of FIG. 11, compensation data is calculated on the basis of camera intensities of captured images at sample gray scale levels 32G and 192G having a predetermined difference in gray scale level in a specific luminance mode, the compensation data is converted to a voltage, and the voltage is converted to data, which will be applied as a compensation value of the display panel, of an output image in the above-described method. In a linear function of connecting the sample gray scale levels on an input voltage (x) axis and an output voltage (y) axis illustrated in FIG. 11, compensation voltages may be determined in all luminance modes by calculating an inclination a and a y-intercept b.

Figure 12:
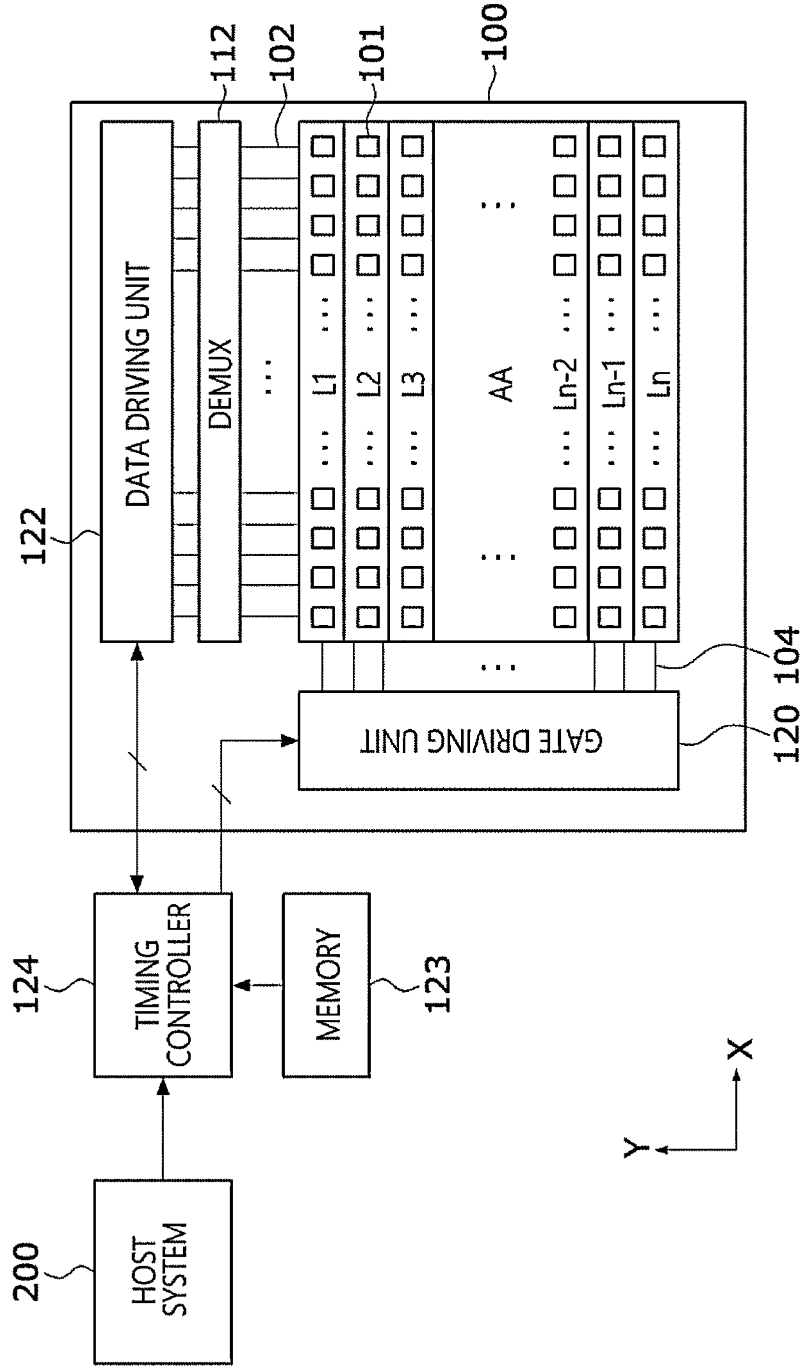
FIGS. 12 and 13 are block diagrams illustrating a display device according to an embodiment of the present disclosure.
Figure 13:
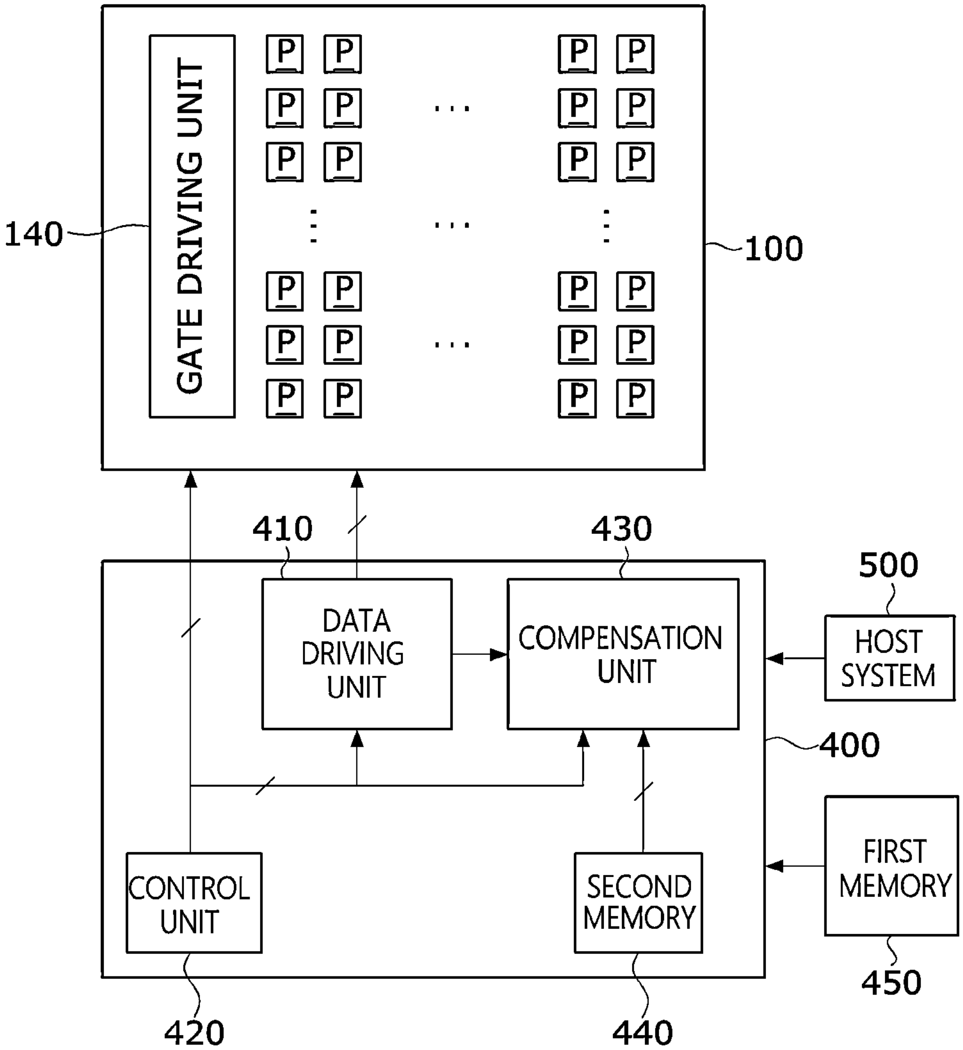

FIGS. 12 and 13 are block diagrams illustrating a display device according to an embodiment of the present disclosure.

Referring to FIG. 12, the display device includes a display panel 100 and pixel driving units for writing pixel data in pixels of the display panel 100.

The display panel 100 includes a pixel array AA configured to display an input image. The pixel array AA includes a plurality of data lines 102, a plurality of gate lines 104 intersecting the data lines 102, and the pixels.

The pixels may be disposed as the pixel array AA in the screen to have a matrix shape defined by the data lines (DLs) and the gate lines (GLs). The pixels may be disposed in the pixel array AA to have one of various shapes such as a shape in which the pixels for emitting light having the same color are shared, a stripe shape, and a diamond shape other than the matrix shape.

The pixel array includes pixel columns and pixel lines L1 to Ln intersecting the pixel columns. The pixel columns include the pixels disposed in a Y-axis direction. The pixel lines include the pixels disposed in an X-axis direction. One vertical period is a time period in which pixel data of one frame is written to all pixels of the screen. One horizontal period is a scan time in which the pixel data to be written to the pixels of one pixel line sharing the gate line is written to the pixels of the one pixel line. The one horizontal period is a time in which the one frame period is divided by m which is the number of the pixel lines L1 to Lm.

Each of the pixels may be divided into a red (R) sub-pixel, a green (G) sub-pixel, and a blue (B) sub-pixel to implement colors. Each of the pixels may also further include a white sub-pixel. Each of the sub-pixels includes a pixel circuit. The pixel circuit may include a light-emitting element, a driving element connected to the light-emitting element, a plurality of switch elements, and capacitors. The light-emitting element may be formed as an organic light-emitting diode (OLED). The driving element and the switch elements may be formed as transistors.

The light-emitting element emits light using a current generated due to a gate-source voltage, which is changed according to a data voltage of the pixel data, of the driving element. The OLED may include organic compound layers formed between an anode and a cathode. The organic compound layers may include a hole injection layer (HIL), a hole transport layer (HTL), light-emitting layer (EML), an electron transport layer (ETL), an electron injection layer (EIL), and the like but are not limited thereto.

Electric properties of the driving element should be uniform between all pixels but may be different between the pixels due to process deviations and element property deviations and may be changed as a display driving time elapses. In order to compensate for such electric property deviations of the driving element, the organic light-emitting display device may include an internal compensation circuit and an external compensation circuit. The internal compensation circuit is added to the pixel circuit in each of the sub-pixels, samples a threshold voltage and/or a mobility, which is changed according to the electric properties of the driving element, and compensates for the change in real time. The external compensation circuit transmits the threshold voltage and/or the mobility, of the driving element, which is sensed through a sensing line connected to each of the sub-pixels, to an external compensation unit. The external compensation circuit modulates the pixel data of the input image in reflection with a sensing result to compensate for the change in electrical property of the driving element. A voltage, which is changed due to electric properties of an external compensation driving element, is sensed, and an external circuit modulates the input image data on the basis of the sensed voltage to compensate for the electric property deviation of the driving element between the pixels.

The compensation data derived by the luminance compensation device of the present disclosure is set to each of the sub-pixels in order to compensate for a luminance deviation between the pixels. The compensation data may be stored in a memory of the compensation unit separately provided in addition to the internal compensation circuit and the external compensation circuit.

Touch sensors may be disposed on the display panel 100. Touch input may be sensed using separate touch sensors or sensed through pixels. The touch sensors may be implemented as on-cell-type or add-on-type sensors disposed on the display panel or in-cell-type touch sensors embedded in the pixel array.

The pixel driving units 120, 112, and 122 may include a data driving unit 122 and a gate driving unit 120. A demultiplexer (DEMUX) 112 may be disposed between the data driving unit 122 and data lines 102.

The pixel driving units 120, 112, and 122 write the input image data to the pixels of the display panel 100 to display the input image on the screen under control of a timing controller (TCON) 124. The pixel driving units 120, 112, and 122 may further include a touch sensor driving unit for driving the touch sensors. The touch sensor driving unit is omitted in FIG. 1.

The data driving unit 122 may be implemented as one or more source driver ICs. The data driving unit 122 converts the pixel data (digital data) received from the TCON 124 to a gamma compensation voltage to output a data voltage. The data voltage may be directly supplied to the data lines 102 or distributed to the data lines 102 through the DEMUX 112.

The DEMUX 112 is disposed between the data driving unit 122 and the data lines 102. The DEMUX 112 distributes data voltages sequentially output through one channel of the data driving unit 122 to the plurality of data lines 102 using a plurality of switch elements disposed between and connected to the one channel of the data driving unit 122 and the plurality of data lines. Since the one channel of the data driving unit 122 is connected to the plurality of data lines 102 through the DEMUX 112, the number of channels of the data driving unit 122 may be reduced.

Along with a thin film transistor (TFT) array of the pixel array AA, the gate driving unit 120 may be implemented as a gate in panel (GIP) circuit directly formed in a bezel region in the display panel 100. The gate driving unit 120 outputs gate signals to the gate lines 104 under control of the TCON 124. The gate driving unit 120 may shift the gate signals to sequentially supply the signals to the gate lines 104 using a shift register. The gate signal may include a gate signal (or scan signal) synchronized with the data voltage.

The TCON 124 may include a control unit configured to generate timing control signals synchronized with the pixel data transmitted to the data driving unit 122 to control operation timings of the pixel driving units 120, 112, and 122 and a compensation unit configured to modulate the pixel data using the compensation data preset by the luminance deviation compensation device.

The TCON 124 receives the pixel data of the input image and timing signals synchronized with the pixel data from a host system 500. The pixel data is digital data. The timing signals received by the TCON 124 may include a vertical synchronization signal (Vsync), a horizontal synchronization signal (Hsync), a clock signal (DCLK), a data enable signal (DE), and the like. The TCON 124 may count the data enable signal (DE) to generate a vertical period timing and a horizontal period timing. In this case, the vertical synchronization signal (Vsync) and the horizontal synchronization signal (Hsync) may be omitted from the timing signals received by the TCON 124.

The TCON 124 generates data timing control signals for controlling operation timings of the pixel driving units 122, 112, and 120 to control the pixel driving units 122, 112, and 120 on the basis of the timing signals (Vsync, Hsync, and DE) received from the host system 500. A voltage level of a gate timing control signal output from the TCON 124 may be converted to a gate-on voltage and a gate-off voltage through a level shifter which is not illustrated and may be supplied to the gate driving unit 120. The level shifter converts a low level voltage of the gate timing control signal to a low gate voltage (VGL) and converts a high level voltage of the gate timing control signal to a high gate voltage (VGH).

The compensation unit of the TCON 124 modulates the pixel data of the input image to transmit the data to the data driving unit 122 using compensation values read from a memory 123 in order to compensate for luminance deviations on the screen according to the above-described embodiments. The stored compensation values are stored in the memory 123. The compensation values include an inclination a and a y-intercept b of a compensation voltage in the method of compensating for a luminance deviation and a look-up table (LUT) with preset gray scale level and voltage set corresponding to luminance.

The host system 500 may be any one among a television (TV) system, a set-top box, a navigation system, a personal computer (PC), a vehicle system, a home theater system, a mobile device, and a wearable device.

As illustrated in FIG. 13, in the case of the mobile or wearable device, a data driving unit 410, a control unit 420 and a compensation unit 430 of the TCON, a second memory 440, a power circuit and a level shifter which are omitted in the drawing, and the like may be integrated in one driver IC 400. The power circuit provides power needed to drive pixels P of the display panel. In the display device illustrated in FIG. 13, a gate driving unit 140 may be disposed on the display panel 100.

In FIG. 13, when the power is input to the display device, the second memory 440 stores compensation values for each position received from the first memory 450 and supplies the compensation values to the compensation unit 430. Compensation data includes output image data derived from the above-described luminance deviation compensation device.

The compensation unit 430 receives pixel data of an input image from the host system 500. The compensation unit 430 modulates the pixel data of the input image in a method illustrated in FIG. 14 and transmits the modulated pixel data to the data driving unit 410 in order to compensate for luminance deviations between the pixels. Accordingly, the pixel data input to the data driving unit 122 is modulated into compensation values derived on the basis of an image captured by the image capturing device 300.

Figure 14:
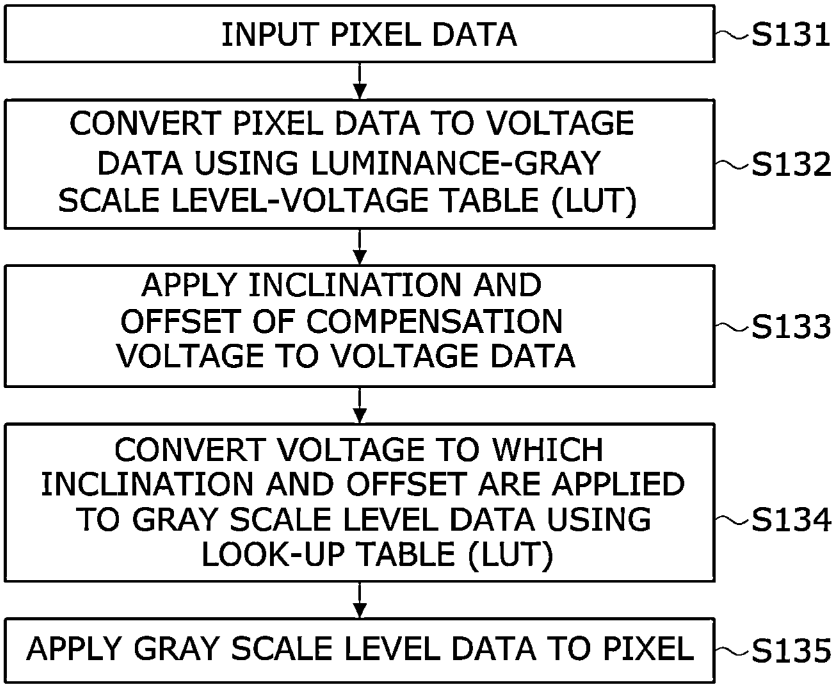
FIG. 14 is a flowchart showing a method of modulating pixel data input to the display device illustrated in FIGS. 12 and 13.

FIG. 14 is a flowchart showing the method of modulating the pixel data.

Referring to FIG. 14, the compensation unit 430 converts the pixel data (gray scale level data) of the input image to voltage data using a look-up table (LUT) with preset gray scale level and voltage set corresponding to luminance (S131 and S132). The compensation unit 430 multiplies the voltage data and an inclination of a compensation voltage modeled as a linear function and adds the voltage data and an offset (y-intercept) (S133). In addition, the compensation unit 430 converts voltages of the pixel data, to which the inclination and offset of the compensation voltage are applied, to pixel data (gray scale level data) to be written to the pixels using the look-up table (LUT) (S134 and S135). The pixel data modulated as described above is transmitted to the data driving unit 122 or 410 and converted to data voltages, and the converted data voltages are supplied to the pixels through the data lines.

The method for compensating a luminance deviation according to embodiments of the present disclosure are as follows:

Embodiment 1: The method for compensating a luminance deviation includes inputting an input image having first gray scale level data to pixels disposed in a screen of a display panel to capture an image of the screen, and inputting an input image having second gray scale level data to the pixels to capture an image of the screen (S1 in FIG. 3); deriving a difference in pixel value ΔI of the image capturing device between a first pixel and a second pixel in the screen and a difference in gray scale level between the first and second gray scale levels 32G and 36G from a captured image at the first gray scale level 32G and a captured image at the second gray scale level 36G which include pixel values of the image capturing device (S2 in FIG. 3); calculating a pixel value for the second pixel from the captured image at the first gray scale level 32G (S3 in FIG. 3); and converting the difference in pixel value of the image capturing device between the first pixel and the second pixel at the first gray scale level to a difference in gray scale level to derive compensation data of the second pixel using the difference in pixel value of the image capturing device and the difference in gray scale level (S4 in FIG. 3).

Embodiment 2: The first pixel may be a reference pixel positioned at a center of the screen.

Embodiment 3: An exposure value of the image capturing device may be set as an exposure value when the pixel value for the first pixel to which the first gray scale level data is written is a median value in a range of the pixel value. The captured image at the first gray scale level and the captured image at the second gray scale level may be obtained when the images of the screen are captured using the same exposure value.

Embodiment 4: The difference in pixel value of the image capturing device and the difference in gray scale level between the first and second gray scale levels may be derived from a linear line of linear function.

Embodiment 5: The method further includes comprising converting the compensation data to a compensation voltage using a look-up table (LUT) with preset gray scale level and voltage set corresponding to luminance.

Embodiment 6: The method further includes converting an input image data at the first and second gray scale levels to input voltages; and multiplying the input voltages and an inclination of a linear function and adding the input voltage and a y-intercept using a result of fitting the input voltages and a compensation voltage as the linear function.

Embodiment 7: The method further includes adding the input voltages and the compensation voltage to generate output voltages; and converting the output voltages to compensation gray scale level data using a look-up table (LUT) with preset gray scale level and voltage set corresponding to luminance.

A luminance deviation compensation device according to embodiments of the present disclosure are as follows:

Embodiment 1: A luminance deviation compensation device includes an image capturing device configured to capture an image of a screen of a display panel and output a captured image expressed with pixel values; a display panel in which pixels are disposed; a pixel driving unit configured to write an input image data to the pixels; and a luminance deviation compensation unit which generates an input image having first gray scale level data, receives a captured image at a first gray scale level from the image capturing device, inputs an input image having second gray scale level data, and receives a captured image at a second gray scale level from the image capturing device.

The luminance deviation compensation unit derives a difference in pixel value of the image capturing device between a first pixel and a second pixel and a difference in gray scale level between the first and second gray scale levels from the captured image at the first gray scale level and the captured image at the second gray scale level, calculates a pixel value for the second pixel from the captured image at the first gray scale level, and converts the difference in pixel value of the image capturing device between the first pixel and the second pixel at the first gray scale level to a difference in gray scale level to derive compensation data of the second pixel using the difference in pixel value of the image capturing device and the difference in gray scale level.

Embodiment 2: The luminance deviation compensation unit may calculate the difference in pixel value of the image capturing device and the difference in gray scale level between the first and second gray scale levels from a linear line of linear function.

Embodiment 3: The luminance deviation compensation unit may convert the compensation data to a compensation voltage using a look-up table (LUT) with preset gray scale level and voltage set corresponding to luminance.

Embodiment 4: The luminance deviation compensation unit may convert the input image data at the first and second gray scale levels to input voltages; and multiply the input voltages and an inclination of a linear function and add the input voltages and a y-intercept using a result of fitting the input voltages and the compensation voltage as the linear function.

Embodiment 5: The luminance deviation compensation unit adds the input voltages and the compensation voltage to generate output voltages; and converts the output voltages to compensation gray scale level data using the look-up table (LUT).

A display device according to embodiments of the present disclosure are as follows:

Embodiment 1: A display device includes a display panel 100 including a plurality of data lines, a plurality of gate lines intersecting the data lines, and a plurality of pixels; a compensation unit 430 configured to modulate pixel data of an input image; a data driving unit 410 configured to convert the pixel data modulated by the compensation unit to a data voltage to supply the converted data voltage to the data lines; and a gate driving unit 140 sequentially supplying a gate signal synchronized with the data voltage to the gate lines.

The compensation unit converts a gray scale level of the pixel data of the input image to voltage data using a look-up table (LUT) with preset gray scale level and voltage set corresponding to luminance and converts a result of multiplying the voltage data and an inclination of a compensation voltage modeled as a linear function and adding the voltage data and an offset of the compensation voltage to a gray scale level using the look-up table (LUT) to modulate the pixel data.

Embodiment 2: The display device further includes a memory 440 in which the inclination and the offset of the compensation voltage and the look-up table (LUT) are stored.

According to the present disclosure, a compensation value for compensating for a luminance difference between gray scale levels is calculated using an image captured by an image capturing device without a process in which a scaling gain between an intensity of the image capturing device and luminance data is set and the gain is tuned for each model and each gray scale level.

In the present disclosure, there are no processes in which the intensity of the camera is converted to the luminance data, the luminance data is converted to gray scale level data, and the gray scale level data is converted to a voltage in a nonlinear section, and thus the compensation value for compensating for a luminance deviation of which an error is minimized can be derived.

In the present disclosure, even in a case in which mura levels at a low gray scale level and a high gray scale level are different from each other according to positions of a screen, the luminance deviation can be compensated for.

In addition, in the present disclosure, since a compensation voltage is calculated by being modeled as a simple linear function in a voltage domain, an amount of calculation is small.

Effects which can be achieved by the present disclosure are not limited to the above-mentioned effects. That is, other objects that are not mentioned may be obviously understood by those skilled in the art to which the present disclosure pertains from the following description.

The present disclosure can be achieved as computer-readable codes on a program-recoded medium. A computer-readable medium includes all kinds of recording devices that keep data that can be read by a computer system. For example, the computer-readable medium may be an HDD (Hard Disk Drive), an SSD (Solid State Disk), an SDD (Silicon Disk Drive), a ROM, a RAM, a CD-ROM, a magnetic tape, a floppy disk, and an optical data storage. Accordingly, the detailed description should not be construed as being limited in all respects and should be construed as an example. The scope of the present disclosure should be determined by reasonable analysis of the claims and all changes within an equivalent range of the present disclosure is included in the scope of the present disclosure.

Through the above-described contents, it may be seen that various changes and modifications may be made in the range without departing from the technical spirit of the present disclosure by those skilled in the art. The above descriptions are not to be construed as limiting in all aspects but should be considered as exemplary embodiments. The scope of the present disclosure should be determined by reasonable interpretation of the appended claims, and all modifications within an equivalent range of the present disclosure are encompassed in the scope of the present disclosure.

What is claimed is:

1. A luminance deviation compensation device comprising:
- an image capturing device configured to capture a first image at a first gray scale level and a second image at a second gray scale level different from the first gray scale level on a screen of a display panel, wherein the captured first image is expressed with a first pixel value, the captured second image is expressed with a second pixel value, and each of the first pixel value and the second pixel value includes a digital value output from an image sensor of the image capturing device;
- a display panel in which pixels are disposed and displays input image data using the pixels; and
- a luminance deviation compensator configured to:
  - receive the captured first image and the captured second image from the image capturing device,
  - generate a first input image having a first gray scale level data corresponding to the first gray scale level and a second input image having a second gray scale level data corresponding to the second gray scale level, and
  - derive a difference in the first pixel value and the second pixel value of the image capturing device between a first pixel and a second pixel of the display panel and a difference in gray scale level between the first gray scale level and second gray scale level from the first captured image and the second captured image.

2. The luminance deviation compensation device of claim 1, wherein the first pixel is a reference pixel positioned at a center of the screen.

3. The luminance deviation compensation device of claim 1, wherein the captured first image and the captured second image are captured under a same exposure value of the image capturing device.

4. The luminance deviation compensation device of claim 3, wherein an exposure value of the image capturing device is set as an exposure value when a pixel value for the first pixel of the display panel to which the first gray scale level data is written is a median value in a range of the pixel value; and
- wherein the captured first image at the first gray scale level and the captured second image at the second gray scale level are obtained when the images of the screen are captured using the same exposure value.

5. The luminance deviation compensation device of claim 1, wherein the luminance deviation compensator calculates a pixel value for the second pixel from the first captured image at the first gray scale level, and
- converts the difference in the pixel values of the image capturing device between the first pixel and the second pixel at the first gray scale level to a difference in gray scale levels to derive compensation data of the second pixel using the difference in the pixel values of the image capturing device and the difference in the gray scale levels.

6. The luminance deviation compensation device of claim 5, wherein the luminance deviation compensator calculates the difference in pixel values of the image capturing device and the difference in gray scale levels between the first and second gray scale levels from a linear line of a linear function.

7. The luminance deviation compensation device of claim 5, wherein the luminance deviation compensator converts the compensation data to a compensation voltage using a look-up table (LUT) with preset gray scale level and voltage set corresponding to luminance.

8. The luminance deviation compensation device of claim 6, wherein the luminance deviation compensator:
- converts the input image data at the first and second gray scale levels to input voltages; and
- multiplies the input voltages and an inclination of a linear function and adds the input voltages and a y-intercept using a result of fitting the input voltages and the compensation voltage as the linear function.

9. The luminance deviation compensation device of claim 8, wherein the luminance deviation compensator:
- adds the input voltages and the compensation voltage to generate output voltages; and
- converts the output voltages to compensation gray scale level data using the look-up table (LUT).

* * * * *